United States Patent
Cook et al.

(10) Patent No.: US 7,659,488 B2
(45) Date of Patent: *Feb. 9, 2010

(54) COMPOSITE ELECTRODE FOR A PLASMA ARC TORCH

(75) Inventors: David J. Cook, Bradford, VT (US);
Kirk H. Ferland, Newport, NH (US);
Charles M. Hackett, Hanover, NH (US); Yong Yang, Hanover, NH (US);
Richard W. Couch, Jr., Hanover, NH (US); Zhipeng Lu, Lincoln, MA (US)

(73) Assignee: Hypertherm, Inc., Hanover, NH (US)

( * ) Notice: Subject to any disclaimer, the term of this patent is extended or adjusted under 35 U.S.C. 154(b) by 257 days.

This patent is subject to a terminal disclaimer.

(21) Appl. No.: 11/495,945

(22) Filed: Jul. 28, 2006

(65) Prior Publication Data

US 2006/0289407 A1 Dec. 28, 2006

Related U.S. Application Data

(63) Continuation of application No. 10/957,478, filed on Sep. 30, 2004, now abandoned, which is a continuation of application No. 10/094,000, filed on Mar. 8, 2002, now Pat. No. 6,841,754.

(60) Provisional application No. 60/274,837, filed on Mar. 9, 2001.

(51) Int. Cl.
*B23K 10/00* (2006.01)
(52) U.S. Cl. .......................... 219/121.52; 219/121.59; 219/121.49; 219/75; 313/231.31
(58) Field of Classification Search ............. 219/121.5, 219/121.51, 121.52, 121.59, 121.39, 74, 219/75, 119; 313/231.31, 231.41
See application file for complete search history.

(56) References Cited

U.S. PATENT DOCUMENTS 2,784,294 A 3/1957 Gravert (Continued)

FOREIGN PATENT DOCUMENTS

EP 0159 256 B1 12/1987

(Continued)

OTHER PUBLICATIONS

Aritoshi et al., "Effect of Thickness of NB Intermediate Layer on Friction Weldability of Tungsten to Copper," Journal of the Japan Welding Society, vol. 20, No. 2, pp. 309-316 (2002).

(Continued)

*Primary Examiner*—Mark H Paschall
(74) *Attorney, Agent, or Firm*—Proskauer Rose LLP

(57) ABSTRACT

A plasma arc torch that includes a torch body having a nozzle mounted relative to a composite electrode in the body to define a plasma chamber. The torch body includes a plasma flow path for directing a plasma gas to the plasma chamber in which a plasma arc is formed. The nozzle includes a hollow, body portion and a substantially solid, head portion defining an exit orifice. The composite electrode can be made of a metallic material (e.g., silver) with high thermal conductivity in the forward portion electrode body adjacent the emitting surface, and the aft portion of the electrode body is made of a second low cost, metallic material with good thermal and electrical conductivity. This composite electrode configuration produces an electrode with reduced electrode wear or pitting comparable to a silver electrode, for a price comparable to that of a copper electrode.

30 Claims, 16 Drawing Sheets

U.S. PATENT DOCUMENTS

| | | | |
|---|---|---|---|
| 2,898,441 A | 8/1959 | Reed et al. |
| 2,923,809 A | 2/1960 | Clews et al. |
| 3,004,189 A | 10/1961 | Giannini |
| 3,082,314 A | 3/1963 | Arata et al. |
| 3,131,288 A | 4/1964 | Browning |
| 3,198,932 A | 8/1965 | Weatherly |
| 3,242,305 A | 3/1966 | Kane et al. |
| 3,534,388 A | 10/1970 | Ito et al. |
| 3,619,549 A | 11/1971 | Hogan et al. |
| 3,641,308 A | 2/1972 | Couch, Jr. et al. |
| 3,676,639 A | 7/1972 | Esiban et al. |
| 3,787,247 A | 1/1974 | Couch, Jr. |
| 3,833,787 A | 9/1974 | Couch, Jr. |
| 3,930,139 A | 12/1975 | Bykhovsky et al. |
| 4,133,987 A | 1/1979 | Lakomsky et al. |
| 4,203,022 A | 5/1980 | Couch, Jr. et al. |
| 4,275,287 A | 6/1981 | Hiratake |
| 4,365,136 A * | 12/1982 | Gottlieb | 219/121.65 |
| 4,463,245 A | 7/1984 | McNeil |
| 4,567,346 A | 1/1986 | Marhic |
| 4,625,094 A | 11/1986 | Marhic et al. |
| 4,649,257 A | 3/1987 | Yakovlevitch et al. |
| 4,701,590 A | 10/1987 | Hatch |
| 4,748,312 A | 5/1988 | Hatch et al. |
| 4,766,349 A | 8/1988 | Johansson et al. |
| 4,767,908 A | 8/1988 | Dallavalle et al. |
| 4,777,343 A | 10/1988 | Goodwin |
| 4,814,577 A | 3/1989 | Dallavalle et al. |
| 4,853,515 A | 8/1989 | Willen et al. |
| 4,902,871 A | 2/1990 | Sanders et al. |
| 5,021,627 A | 6/1991 | Bersch et al. |
| 5,023,425 A | 6/1991 | Severance, Jr. |
| 5,097,111 A | 3/1992 | Severance, Jr. |
| 5,310,988 A | 5/1994 | Couch, Jr. et al. |
| 5,464,962 A | 11/1995 | Luo et al. |
| 5,601,734 A | 2/1997 | Luo et al. |
| 5,628,924 A | 5/1997 | Yoshimitsu et al. |
| 5,676,864 A | 10/1997 | Walters |
| 5,712,462 A * | 1/1998 | Berkowitz et al. | 219/117.1 |
| 5,726,414 A | 3/1998 | Kitahashi et al. |
| 5,906,758 A | 5/1999 | Severance, Jr. |
| 5,908,567 A | 6/1999 | Sakuragi et al. |
| 5,951,888 A | 9/1999 | Oakley |
| 6,020,572 A | 2/2000 | Marner et al. |
| 6,031,197 A | 2/2000 | Larsson |
| 6,054,669 A | 4/2000 | Warren, Jr. |
| 6,066,827 A | 5/2000 | Nemchinsky |
| 6,156,995 A | 12/2000 | Severance, Jr. |
| 6,191,381 B1 | 2/2001 | Kabir |
| 6,215,090 B1 | 4/2001 | Severance, Jr. et al. |
| 6,215,235 B1 | 4/2001 | Osamura |
| 6,329,627 B1 | 12/2001 | Walters |
| 6,346,685 B2 | 2/2002 | Severance, Jr. et al. |
| 6,362,450 B1 | 3/2002 | Severance, Jr. |
| 6,420,673 B1 | 7/2002 | Nemchinsky |
| 6,452,130 B1 | 9/2002 | Qian et al. |
| 6,492,037 B2 | 12/2002 | Shindo et al. |
| 6,657,153 B2 | 12/2003 | McBennett et al. |
| 6,841,754 B2 | 1/2005 | Cook et al. |

FOREIGN PATENT DOCUMENTS

| | | |
|---|---|---|
| EP | 0157 702 B1 | 6/1988 |
| EP | 0 437 915 A2 | 1/1990 |
| EP | 0 529 850 A2 | 3/1993 |
| EP | 1 202 614 A2 | 5/2002 |
| EP | 1147692 B1 | 6/2002 |
| EP | 102330660 A2 | 8/2002 |
| FR | 2044232 | 2/1971 |
| GB | 1008687 | 11/1965 |
| JP | 01212674 | 8/2001 |
| JP | 01232475 | 8/2001 |
| WO | WO 98/40186 | 9/1998 |
| WO | WO 00/02697 | 1/2000 |
| WO | WO 01/66298 A1 | 9/2001 |

OTHER PUBLICATIONS

Arishoshi et al., "Friction Welding of Pure Tungsten to Oxygen Free Copper with an Intermediate Layer," Welding International vol. 11, No. 5, pp. 353-360 (1997).

"Technology for Friction Welding of Tungsten to Copper," New Technology & Products of JETRO, Jun. 1996, pp. 21-22.

www.mtiwelding.com/friction_welding/advantages.htm, May 16, 2001.

www.mtiwelding.com/friction_welding/weldable_materials.htm, May 16, 2001.

* cited by examiner

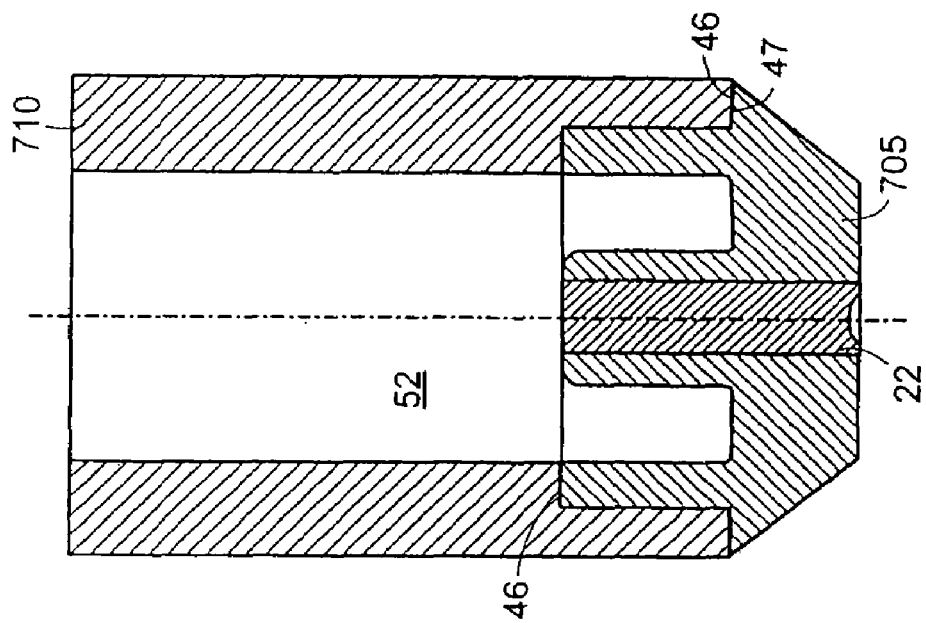
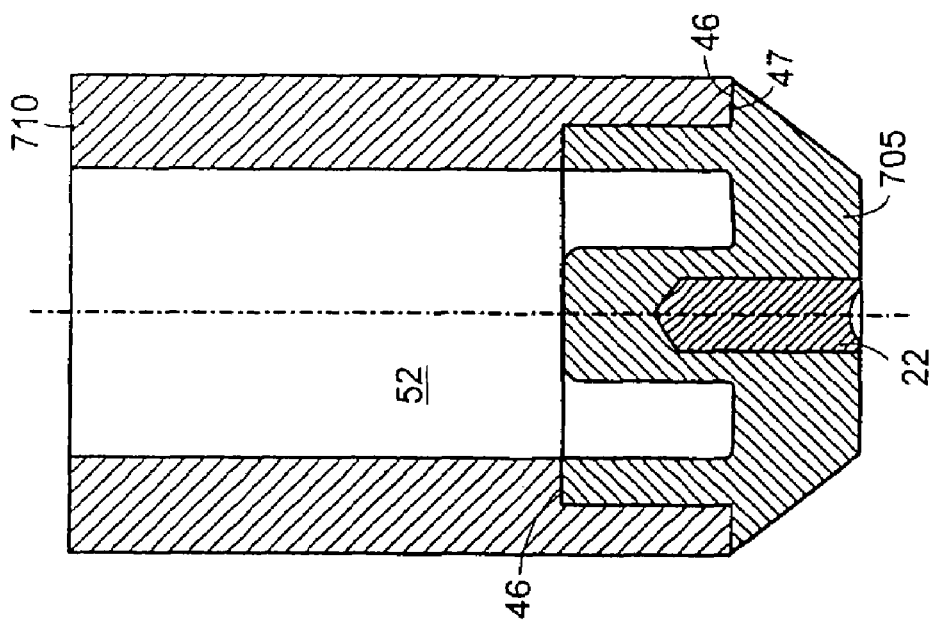

COMPOSITE ELECTRODE FOR A PLASMA ARC TORCH

RELATED APPLICATIONS

This application is a continuation of application Ser. No. 10/957,478, filed Sep. 30, 2004, which is a continuation of application Ser. No. 10/094,000, filed on Mar. 8, 2002, which claims benefit of U.S. Provisional Application No. 60/274,837, filed Mar. 9, 2001. The entire disclosures of these applications are incorporated herein by reference.

FIELD OF THE INVENTION

The present invention relates to a composite electrode for a plasma arc torch. In particular, the invention relates to a composite electrode for a plasma arc torch in which a forward portion of the electrode body comprises a first metallic material having high thermal conductivity and the remaining aft portion of the electrode body comprises a second low cost, metallic material with good thermal and electrical conductivity.

BACKGROUND OF THE INVENTION

Plasma arc torches are widely used in the cutting or marking of metallic materials. A plasma torch generally includes an electrode mounted therein, a nozzle with a central exit orifice mounted within a torch body, electrical connections, passages for cooling and arc control fluids, a swirl ring to control fluid flow patterns in the plasma chamber formed between the electrode and nozzle, and a power supply. The torch produces a plasma arc, which is a constricted ionized jet of a plasma gas with high temperature and high momentum. Gases used in the torch can be non-reactive (e.g. argon or nitrogen), or reactive (e.g. oxygen or air).

In operation, a pilot arc is first generated between the electrode (cathode) and the nozzle (anode). Generation of the pilot arc may be by means of a high frequency, high voltage signal coupled to a DC power supply and the torch or any of a variety of contact starting methods.

One known configuration of an electrode for a plasma arc torch includes an emitting insert (e.g., hafnium) which is press fit into a bore in the electrode. An objective in electrode design is to transfer heat from the hafnium insert and into a cooling medium, which is usually water. Another objective is to control arc root attachment to minimize erosion caused by undesirable arc root attachment to the electrode instead of the hafnium insert.

Electrodes for plasma arc torches are commonly made from copper. Copper is a low cost material that offers good thermal and electrical conductivity. Electrodes for plasma arc torches can also be made from silver. While silver electrodes provide excellent heat transfer characteristics, they tend to be very expensive and not cost effective to use. Copper electrodes are cost effective, but do not have the superior heat transfer characteristics of a silver electrode and thus have a shorter electrode life than silver electrodes.

Several companies manufacture silver and silver/copper composite electrodes using a variety of manufacturing techniques including brazing, soldering, swaging, press fitting and other methods. One company has developed a vacuum brazed copper/silver composite design with a through-hole hafnium insert. Another company has developed a press-fitted silver annulus design with a blind hole hafnium insert. Another company has developed a swaged silver annulus design in a copper holder with copper on the front portion. Another company has developed coined silver electrode design. However, these methods of manufacturing silver/copper electrodes do not produce a sufficiently high-strength joint at the silver/copper interface. In addition, these manufacturing methods result in electrodes that can leak cooling fluid at the silver/copper interface. More significantly, these silver/composite electrodes do not offer the heat transfer characteristics of an all silver electrode.

SUMMARY OF THE INVENTION

It is an object of the present invention to provide an improved composite electrode, which combines the material property benefits of silver with the cost benefits of copper.

Another object of the present invention is to provide an improved composite electrode that does not leak cooling fluid.

In one aspect, the invention features a plasma arc torch for cutting or marking a metallic workpiece. The torch includes a torch body having a nozzle mounted relative to a composite electrode in the body to define a plasma chamber. The torch body includes a plasma flow path for directing a plasma gas to the plasma chamber. In one embodiment, the torch can also include a shield attached to the torch body. The nozzle, composite electrode and shield are consumable parts that wear out and require periodic replacement.

The composite electrode has two portions made from different materials. The forward portion of the electrode comprises a metallic material with excellent heat transfer properties (e.g., high thermal conductivity) (e.g., silver). An emissive insert (e.g., hafnium, zirconium, tungsten, thorium, lanthanum, strontium, or alloys thereof) is disposed in a bore in the forward portion. The aft portion of the electrode comprises a low cost, metallic material with good heat transfer properties (e.g., good thermal conductivity) (e.g., copper).

The high thermal conductivity, forward portion is joined onto an end of the good thermal conductivity, aft portion to form the composite electrode. The two portions are joined by a direct welding process, such as friction welding, inertia friction welding, direct drive friction welding, CD percussive welding, percussive welding, ultrasonic welding, or explosion welding, that forms a hermetic seal between the two portions of the electrode. To maximize cooling, the forward portion also extends back to the area of cooling fluid flow and is therefore directly cooled by the fluid. This construction, in contrast to known electrode designs having a relatively small diameter, high thermal conductivity sleeve inserted into a cavity formed in the front end for surrounding an emissive insert, is believed to provide an electrode that has superior heat transfer properties and does not leak cooling fluid.

In another aspect, the invention features a composite electrode for a plasma arc torch for cutting or marking a metallic workpiece. The composite electrode includes a forward portion comprising a metallic material with excellent heat transfer material properties (e.g., high thermal conductivity) (e.g., silver). The aft portion of the electrode comprises a low cost, metallic material with good heat transfer material properties (e.g., good thermal conductivity) (e.g., copper).

The high thermal conductivity, forward portion is joined onto an end of the good thermal conductivity, aft portion to form the composite electrode. In one embodiment, the forward and aft portions are in direct contact at the mating surface. To accomplish this, the two portions are joined together by a direct welding technique—such as friction welding, inertia friction welding, direct drive friction welding, CD percussive welding, percussive welding, ultrasonic welding, or explosion welding. The direct welding process forms a high strength, hermetic seal between the two portions of the electrode. To maximize cooling, the forward portion also extends back to the area of cooling fluid flow and is therefore directly cooled by the fluid.

Yet another aspect of the invention features a method of manufacturing an electrode for cutting or marking a workpiece. An electrode is provided including a forward portion comprising a metallic material with excellent heat transfer material properties (e.g., high thermal conductivity) (e.g., silver). An aft portion of the electrode body is also provided, comprising a low cost, metallic material with good heat transfer material properties (e.g., good thermal conductivity) (e.g., copper). The two portions of the electrode are joined by a direct welding technique. They can be joined, for example, by friction welding, inertia friction welding, direct drive friction welding, CD percussive welding, percussive welding, ultrasonic welding, or explosion welding, thereby forming a high strength, hermetic seal between the forward and aft portions of the electrode. Cooling fluid flow can be used to cool the forward portion of the electrode, and an insert with high thermionic emissivity can be located in a bore in the forward portion of the electrode body.

DETAILED DESCRIPTION OF THE INVENTION

Figure 1:
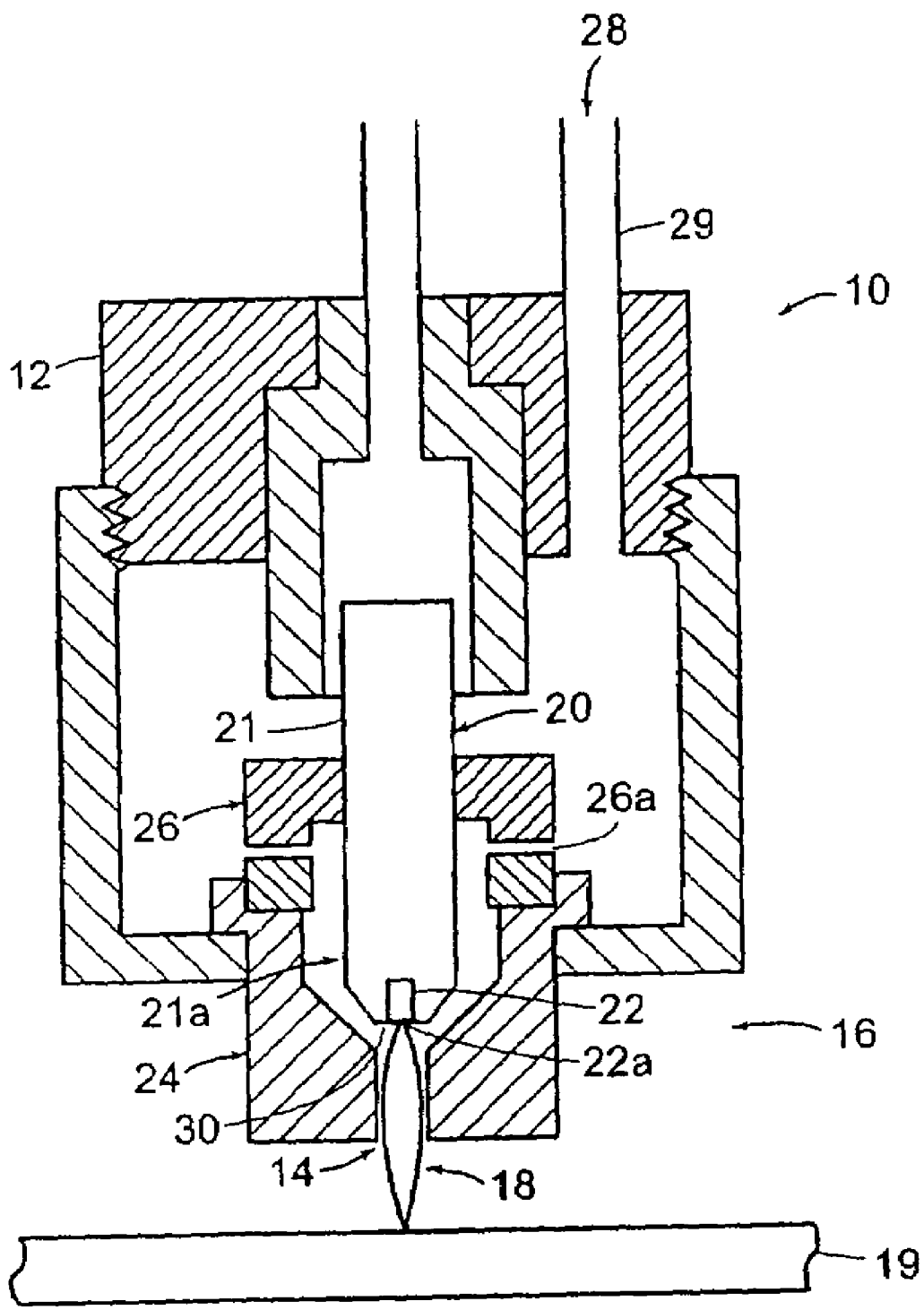
FIG. 1 is a cross-sectional view of one embodiment of a plasma arc torch according to the invention.

FIG. 1 shows a plasma arc torch 10 embodying the principles of the invention. The torch has a body 12, which is typically cylindrical with an exit orifice 14 at a lower end 16. A plasma arc 18, i.e. an ionized gas jet, passes through the exit orifice and attaches to a workpiece 19 being cut. The torch is designed to pierce, cut, or mark metal, particularly mild steel, or other materials in a transferred arc mode. In cutting mild steel, the torch operates with a reactive gas, such as oxygen or air, as the plasma gas to form the transferred plasma arc 18.

The torch body 12 supports a composite electrode 20 having a generally cylindrical body 21. A hafnium insert 22 is disposed in the lower end 21a of the composite electrode 20 so that a planar emission surface 22a is exposed. The insert 22 can also be made of other materials possessing suitable physical properties, such as corrosion resistance and a high thermionic emissivity. In one embodiment, the insert material has an electron work function of about 5.5 electron volts or less. Suitable materials include hafnium, zirconium, tungsten, yttrium, iridium, and alloys thereof. The torch body also supports a nozzle 24, which is spaced from the composite electrode. The space between the nozzle 24 and the composite electrode 20 defines a plasma chamber 30. The nozzle 24 has a central orifice that defines the exit orifice 14. A swirl ring 26 mounted to the torch body has a set of radially offset (or canted) gas distribution holes 26a that impart a tangential velocity component to the plasma gas flow causing it to swirl. This swirl creates a vortex that constricts the arc and stabilizes the position of the arc on the insert.

There are two ways to start the torch. One solution has been contact starting, one form of which is described in U.S. Pat. No. 4,791,268. However, a principal starting technique currently in use uses a high frequency, high voltage (HFHV) signal coupled to a power line from a D.C. power supply to the torch. The HFHV signal induces a spark discharge in a plasma gas flowing between the composite electrode and a nozzle, typically in a spiral path. A HFHV generator is usually incorporated in a power supply or in a "console" located remotely from the torch and connected to the torch by a lead set.

The arc between the electrode and nozzle is a pilot arc, and the arc between the composite electrode and the workpiece is a transferred arc. The gas flow through the nozzle is ionized by the pilot arc so that the electrical resistance between the composite electrode and the workpiece becomes very small. Using a pilot resistor, a higher voltage is applied across the composite electrode and the workpiece to induce the arc to transfer to the workpiece after the gap is ionized. The time between starting the pilot arc and transferring to the work is a function of the distance of the torch above the work, the pilot arc current level, and the gas flow rate when the traditional start circuits are used.

Electrodes have been commonly manufactured from copper. Copper has been chosen because of its good heat transfer capabilities and low cost. Applicants have determined that significant improvements in the service life of electrodes can be achieved using a high purity all-silver or coined silver electrode (e.g., 90% silver, 10% copper) with a swaged hafnium emitting element. Test results have shown over 2000 starts for such an electrode in laboratory testing with a plasma arc torch operating using a non-ramp-down process. This type of electrode allows direct water cooling of the silver surrounding the hafnium. However, due to the high material cost of silver, this electrode design is very expensive and has not achieved wide market acceptance.

Applicants have achieved results comparable to an all-silver electrode using a copper/silver composite electrode in accordance with the present invention. To accomplish this, Applicants have optimized the amount of silver through material analysis, steady state heat flux modeling and empirical data collection. Applicants' test results show that significant gains in electrode service life can be realized if the silver component extends from the forward portion of the electrode back into the area of the hollow mill and is directly cooled by water. In one embodiment, both the hafnium insert 22 and the silver are directly cooled by water.

Figure 1A:
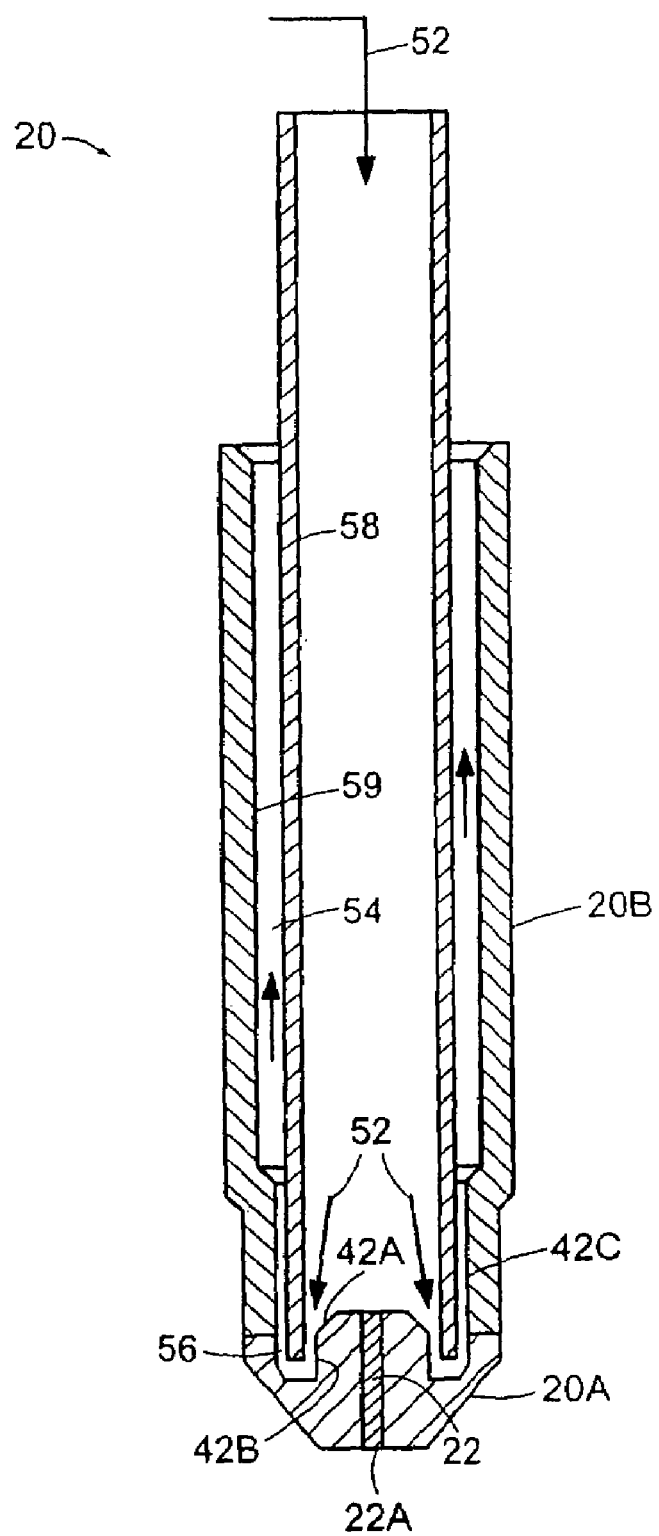
FIG. 1A is a cross-sectional view of one embodiment of a composite electrode for use in the plasma arc torch of FIG. 1.

FIG. 1A shows a cross-sectional view of one embodiment of a composite electrode 20, in which the hafnium insert 22 can be directly cooled by a coolant 52 such as cooling water. The coolant circulates through an internal flow path inside of the composite electrode, including interior surfaces of the aft portion 20B, and across interior surfaces of the forward portion 20A, including the bottom wall 42A and side walls 42B. The cooling fluid exits the composite electrode via the annular passage 54 defined by the tube 58 and the inner wall 59 of the electrode 20. The composite electrode is also preferably "hollowmilled." That is, it has an annular recess 56 formed in the interior surface of the bottom wall 42A, to enhance the surface area of the body material, thereby promoting a heat exchanging relationship with the coolant 52. The planar emission surface 22A is sized, in conjunction with the flow of coolant 52 and the surface areas of the bottom wall 42A and the side walls 42B and 42C, to prevent boiling of the hafnium insert 22. Further, although the insert 22 is illustrated as being a single cylindrical piece, other geometrys are within the scope of the invention. Use of multiple inserts is also contemplated.

In its most basic form, Applicants' electrode includes a forward silver portion directly joined to an aft copper portion. A hafnium insert is disposed in a bore formed in the forward portion. See FIG. 2, described in detail below.

Applicants have recognized the difficulty in obtaining a high strength, leak-proof joint at the copper/silver interface when using conventional methods of joining, such as press-fit, soft-solder, vacuum brazing, torch brazing, threading, adhesive, ultrasonic weld, etc. Use of swaged, soft soldered, silver soldered, or induction brazed techniques used to attach the forward silver portion to the aft copper portion do not result in a reliable hermetic seal. This occurs because the joint must withstand torque during assembly, high pressure coolant during operation, heat stress, thermal expansion and contraction, shear stress, thermal fatigue, etc.

Applicants' invention includes techniques for efficiently and effectively joining the aft portion 20B directly with the forward portion 20A. The aft portion 20B has a first mating surface 46 that is joined with a second mating surface 47 of the forward portion 20A, using techniques such as those described below. Combination of the first and second mating surfaces 46 and 47 results in a joint. In one embodiment, the mating surfaces are planar, as illustrated. However, non-planar mating surfaces can be used as well. The term non-planar includes any contour or shape that can be used, for example, with the joining techniques described below. In one preferred embodiment, the first or second mating surface has a circular, planar cross-sectional shape. The size of each mating surface can be the same, or they can be different.

In general, the invention contemplates a process to join directly (i.e., without the use of any additional material) the forward and aft portions. The first mating surface 46 is joined to the second mating surface 47, using a direct welding technique, such as friction welding, which results in the forward and aft portions being in direct contact with each other. Friction welding is widely used to weld dissimilar materials and minimize cost per part. Friction welding is an ideal process for joining dissimilar metals and provides high reliability, low porosity, and excellent strength. Friction welding is an ideal process for forming a high strength, leak-proof weld between silver and copper, resulting in a hermetic seal. In addition, friction welding does not require the use of an additional material (e.g. solder). Friction welding, inertia friction welding, and direct drive friction welding techniques, are performed, for example, by MTI Welding of South Bend, Ind., and are described on their web site. See, for example, http://www.mtiwelding.com. Pages found at this web site describe various suitable welding techniques, and some of the associated metal combinations on which they can be used.

More particularly, these web pages describe friction welding techniques, including inertia friction welding and direct drive friction welding. These techniques can be used to create a joint between dissimilar materials that is of forged quality, and can be used to create a 100% butt joint weld throughout the contact area of the two pieces being joined. These and other direct welding techniques, including CD percussive welding, percussive welding, ultrasonic welding, explosion welding, and others, utilize combinations of workpiece acceleration and deceleration, welding speed, frictional forces, forge forces, and other such physical forces, sometimes in combination with electricity at various voltages and current flows, to create and use force and/or heat in a predetermined and controlled manner, between the workpieces being joined, to create a strong, leak-proof joint without the introduction of extraneous materials (such as flux, solder, braze, or filler materials). They accomplish this utilizing rapid and efficient cycle times, and with minimal loss of the working materials. These techniques are all considered to be within the scope of the invention.

Direct welding techniques, and friction welding techniques in particular, have been successfully employed to join materials such as silver and copper, but are also effective for joining various combinations, for example, of the following materials, or alloys thereof: aluminum, aluminum alloys, brass, bronze, carbides cemented, cast iron, ceramic, cobalt, columbium, copper, copper nickel, iron sintered, lead, magnesium, magnesium alloys, molybdenum, monel, nickel, nickel alloys, nimonic, niobium, niobium alloys, silver, silver alloys, steel alloys, steel-carbon, steel-free machining, steel-maraging, steel-sintered, steel-stainless, steel-tool, tantalum, thorium, titanium, titanium alloys, tungsten, tungsten carbide cemented, uranium, vanadium, valve materials (automotive), and zirconium alloys. Proper use of these techniques results in the significant electrode performance enhancements of the invention, as contrasted, for example, with conventional brazing, soldering, and other joining methods, some of which were discussed earlier.

For purposes of this invention, in addition to the techniques described above, direct welding includes joining methods that create a suitable high-strength joint between the dissimilar metals of the first mating surface 46 and the second mating surface 47, without the need to add additional materials such as braze, flux, solder, or filler materials. For purposes of this invention, direct welding includes inertia friction welding, direct drive friction welding, CD Percussive welding, percussive welding, ultrasonic welding, and explosion welding. These manufacturing methods achieve a direct metallurgical coupling between the first and second mating surfaces, resulting in a strong bond at low cost. The direct contact between the mating surfaces, especially in the absence of solder, flux, braze, filler materials and the like, contributes to the superior performance of the invention. Moreover, it is recognized that an alloy may be formed where the first and second mating surfaces meet, resulting from the combination of these different materials. This alloy may be formed either during direct welding, and/or during subsequent operation of the torch. Applicants have determined that formation of any alloy in this manner does not hinder the performance of the invention. Rather, it is the use of braze, flux, solder, welding filler materials, and the like, such as those used in other types of joining processes, that should be avoided. These types of materials are not used in the direct welding process of the invention, allowing Applicants to achieve the direct contact between the mating surfaces that is required.

In one aspect, Applicants have developed an electrode with an optimal volume and geometry of a forward silver portion and an aft copper portion based on (1) performance and (2) cost and ease of manufacturing. Applicants' composite electrode performs as if it is an all-silver electrode. The electrode approximates the material properties of the more expensive silver material. The electrode uses the requisite volume of silver to provide excellent heat transfer in the forward portion around the emissive insert, to achieve performance and service life equal to that of the all-silver electrode. The requisite geometry and volume can be determined through empirical data collection in the laboratory, and by computer modeling of the heat flux. These techniques can be used, for example, to design electrodes that minimize the amount of silver used during electrode fabrication, thereby reducing the cost of the electrode. Cavities or lumens can be strategically located within portions of the forward and/or aft portions of the electrode body, for example, to enhance cooling capabilities, or to reduce the quantity of material required for fabrication. Applicants have also used these techniques to determine that superior cooling of the hafnium insert 22 is achieved by providing a high thermal conductivity material, such as silver, in the forward portion 20A to surround the circumference of the emissive insert 22, thereby providing contact with the excellent heat transfer property of the forward portion of the electrode along the length of the insert 22, whereby the life of the electrode is extended. Further, Applicants have determined that providing a single radial interface between the insert 22 and the forward silver portion also results in superior electrode performance.

The aft portion 20B of the electrode can be made with a lower cost copper material which still has good heat transfer properties, but results in a composite electrode with performance characteristics comparable to an all-silver electrode for a much lower cost. In addition, as the majority of heat transfer can take place in the forward portion 20A, a higher emphasis on the machinability of the aft portion can be used as a criterion in the material selection of the aft portion. The heat transfer property of the forward and aft portions of the electrode can be, for example, thermal conductivity or thermal diffusivity.

The forward and aft portions of the composite electrode can be made from various combinations of materials. In one embodiment of the invention the thermal conductivity of the forward portion of the electrode (e.g., silver) is generally greater than about 400 Watts/m/deg-K, and the thermal conductivity of the aft portion of the electrode (e.g., copper) is generally less than this amount. In another embodiment, the materials of the forward portion of the electrode have a high thermal diffusivity, generally greater than 0.1 $m^2$/sec., and preferably at least about 0.17 $m^2$/sec. The thermal diffusivity of the aft portion of the electrode is less than the thermal diffusivity of the forward portion. Any material, including alloys, with physical properties such as those listed above can be suitable for use with the invention and are contemplated to be within the scope of the invention.

In addition to silver/copper, other composite or multi-metallic combinations with desirable characteristics for use with the composite electrode of the invention can be used. Different embodiments of the invention can use silver/aluminum, silver/brass, or brass/copper material combinations for the forward and aft portions of the electrode. Applicants usage herein of the term "composite" is intended to mean at least two metallic materials.

Figure 2:
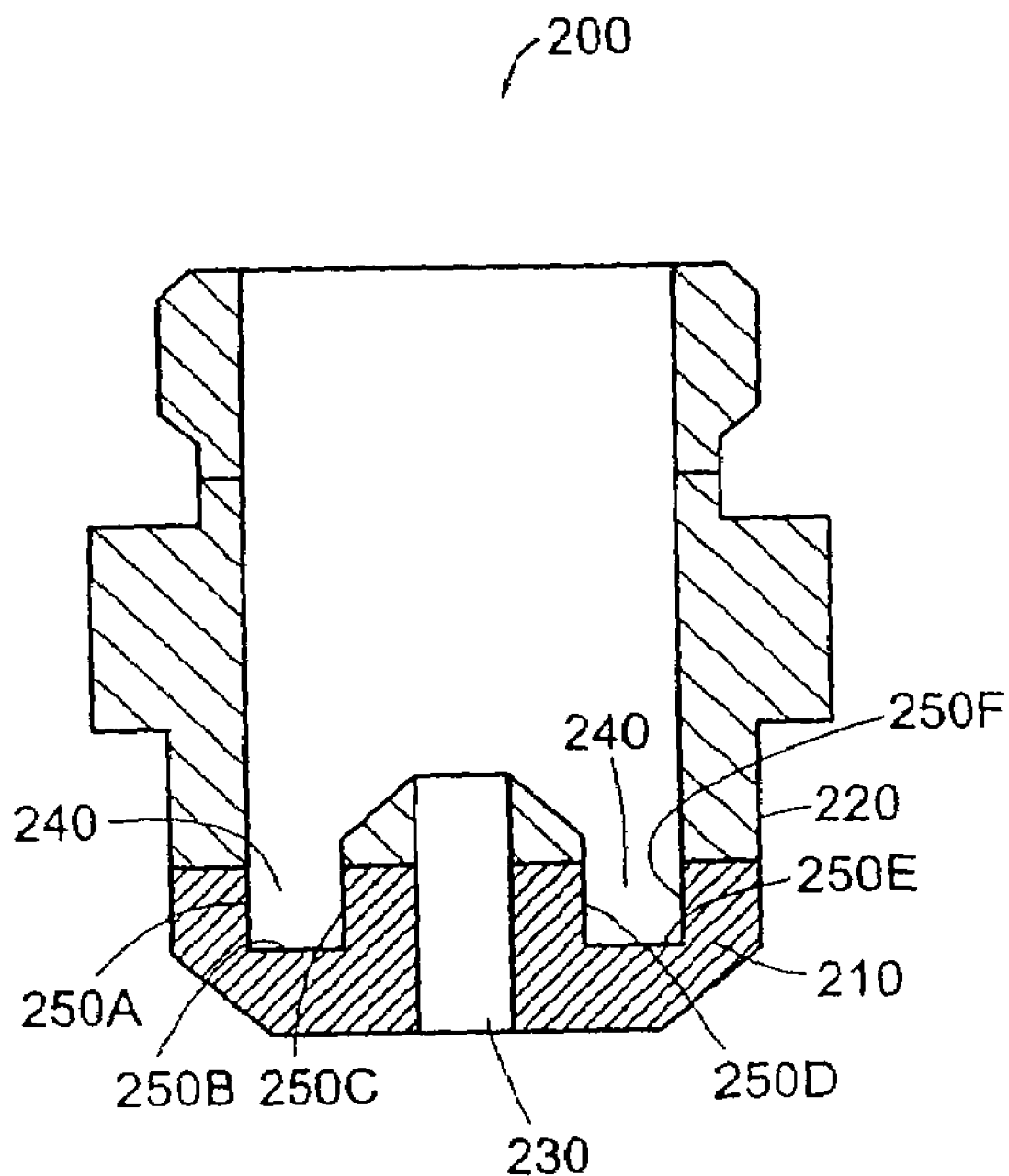
FIG. 2 is a cross-sectional view of another embodiment of a composite electrode for use in the plasma arc torch of FIG. 1.

FIG. 2 is an illustration of an embodiment of an electrode 200 embodying the principles of the present invention. The main components of the electrode 200 are a forward silver portion 210 and an aft copper portion 220, which has been friction-welded to the forward silver portion 210. The friction-welded joint is created where the surfaces of the forward silver portion 210 and the aft copper portion 220 meet. Although the joint is described as friction-welded, the other direct welding joining techniques such as those described above can also be used, and are considered to be within the scope of the invention. Moreover, although the forward silver portion 210 can be primarily silver, other materials such as gold, palladium, silver-copper alloys, brass, rhodium and platinum, and alloys of any of these are also suitable, and are within the scope of the invention.

The joint illustrated in FIG. 2 has a cross-sectional area that extends across the width of the electrode 200. In other embodiments of the invention, the diameters of these portions can be different, and these cross-sectional areas can be different. Further, the shape of the forward portion 210 can be different from the shape of the aft portion 220. For example, the forward portion can be in the shape of a disk or a square, and the aft portion can be in the shape of a tube, with the end of the tube being friction-welded to a surface of the forward portion. Many various shapes and configurations are contemplated, and provide for effective operation of the invention.

In one embodiment of the invention, the forward silver portion 210 comprises or is made of silver and the aft copper portion 220 comprises or is made of copper. The forward silver portion 210 has a bore 230 into which a hafnium insert can be press fit. As illustrated in FIG. 2, the bore 230 can be located along a central axis of the forward portion of the electrode body. The friction weld used to attach the forward silver portion 210 to the aft copper portion 220 results in a reliable, leak-proof hermetic seal along with a high strength weld. To maximize cooling, the forward portion also extends back to the area 240 of cooling fluid flow and is therefore directly cooled by the fluid. In one embodiment, the electrode 200 is of a hollow-milled configuration. As shown in FIG. 2, the hollow-milled configuration results in increased surface area 250A, 250B, 250C, 250D, 250E, and 250F for transferring heat from a hafnium insert to cooling area 240.

Figure 3:
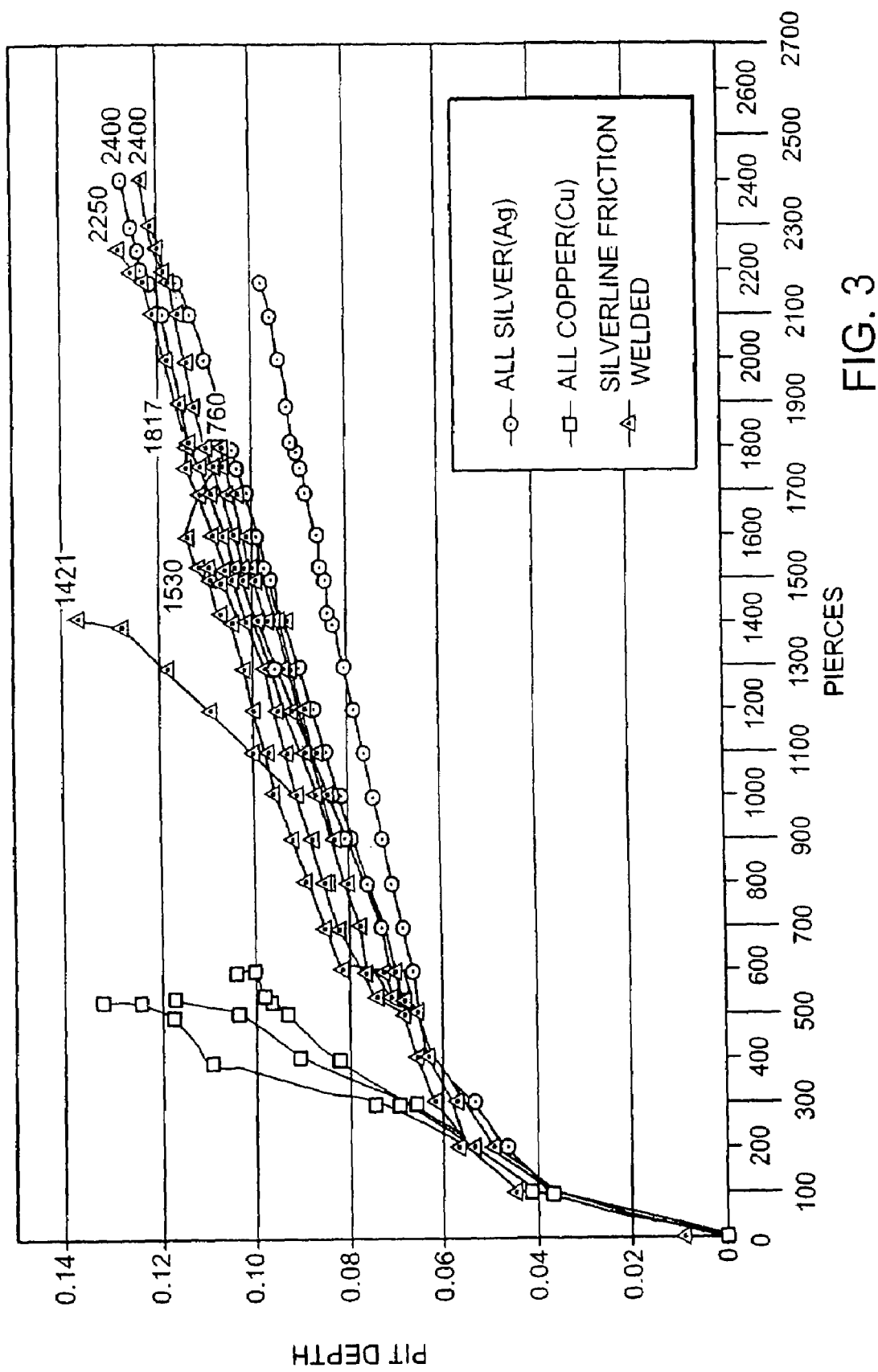
FIG. 3 is a graph comparing the number of starts vs. pit wear from various electrode configurations.

Full strength welds of oxygen-free copper to coined (e.g., 90% silver, 10% copper) silver have been achieved using friction welding. Bend tests and tensile tests showed strength equal to silver material. Laboratory results comparing pit depth of an electrode against the number of pierces for a silver/copper electrode were identical to an all-silver electrode, until the depth of silver was consumed, as shown in FIG. 3. The foregoing are merely representative embodiments, as other configurations are possible and within the scope of the invention.

Figure 4:
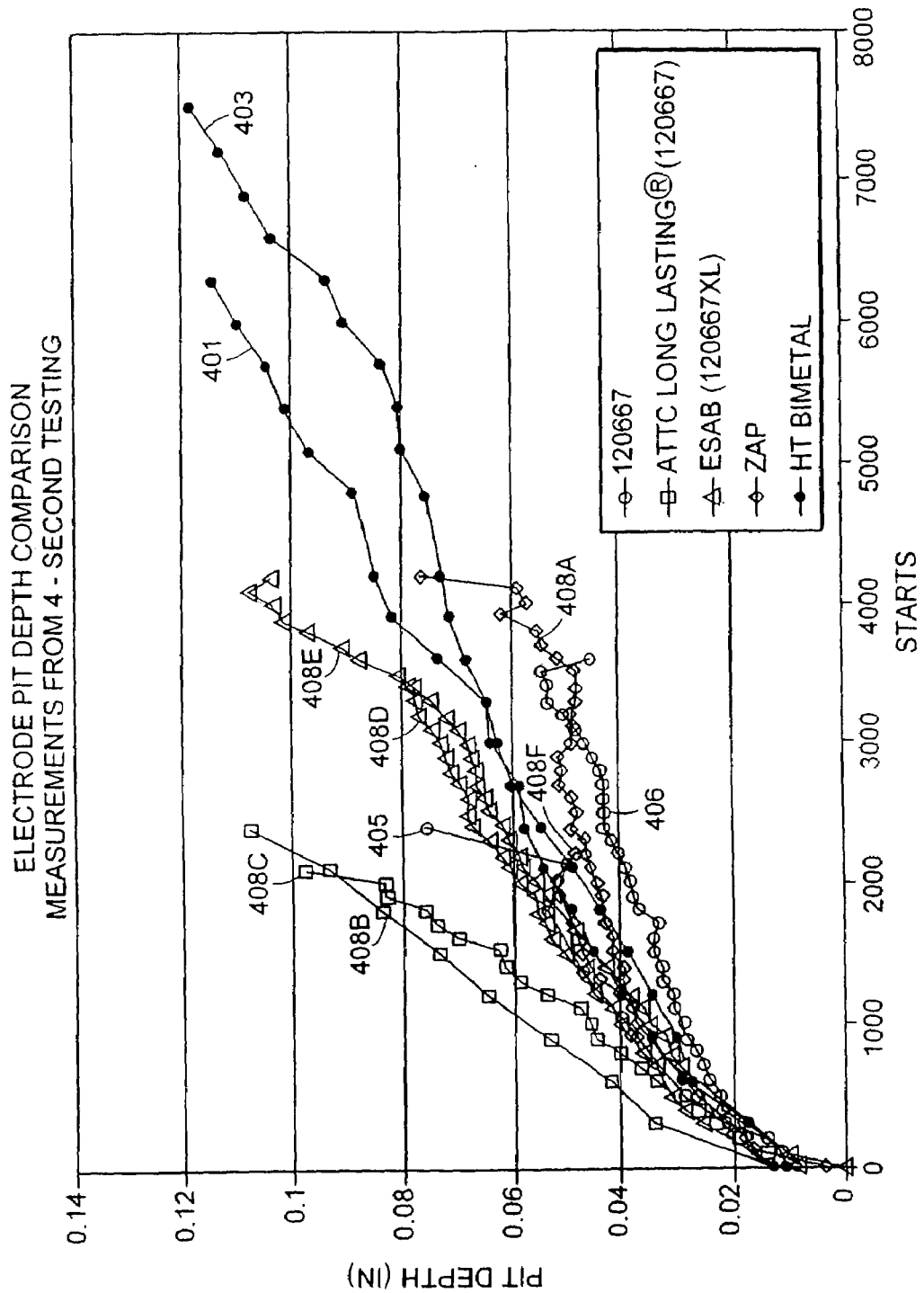
FIG. 4 is a graph comparing the performance of electrodes according to the present invention with other electrodes, using 4 second testing.

FIG. 4 is a graph that shows pit depth versus the number of electrode starts for various electrodes. The performance of electrodes that are manufactured according to the invention are designated as curves 401 and 403 on the graph. This graph compares these results with those of copper electrodes (405 and 406), and with other copper-silver electrode combinations (408A-408F) that are commercially available. The data in FIG. 4 was obtained using 4 second life test testing measurements, i.e., multiple four second runs were made with each of the electrodes, to obtain the information displayed in this graph. The graph shows the superior longevity of electrodes manufactured according to Applicants' invention.

Figure 5:
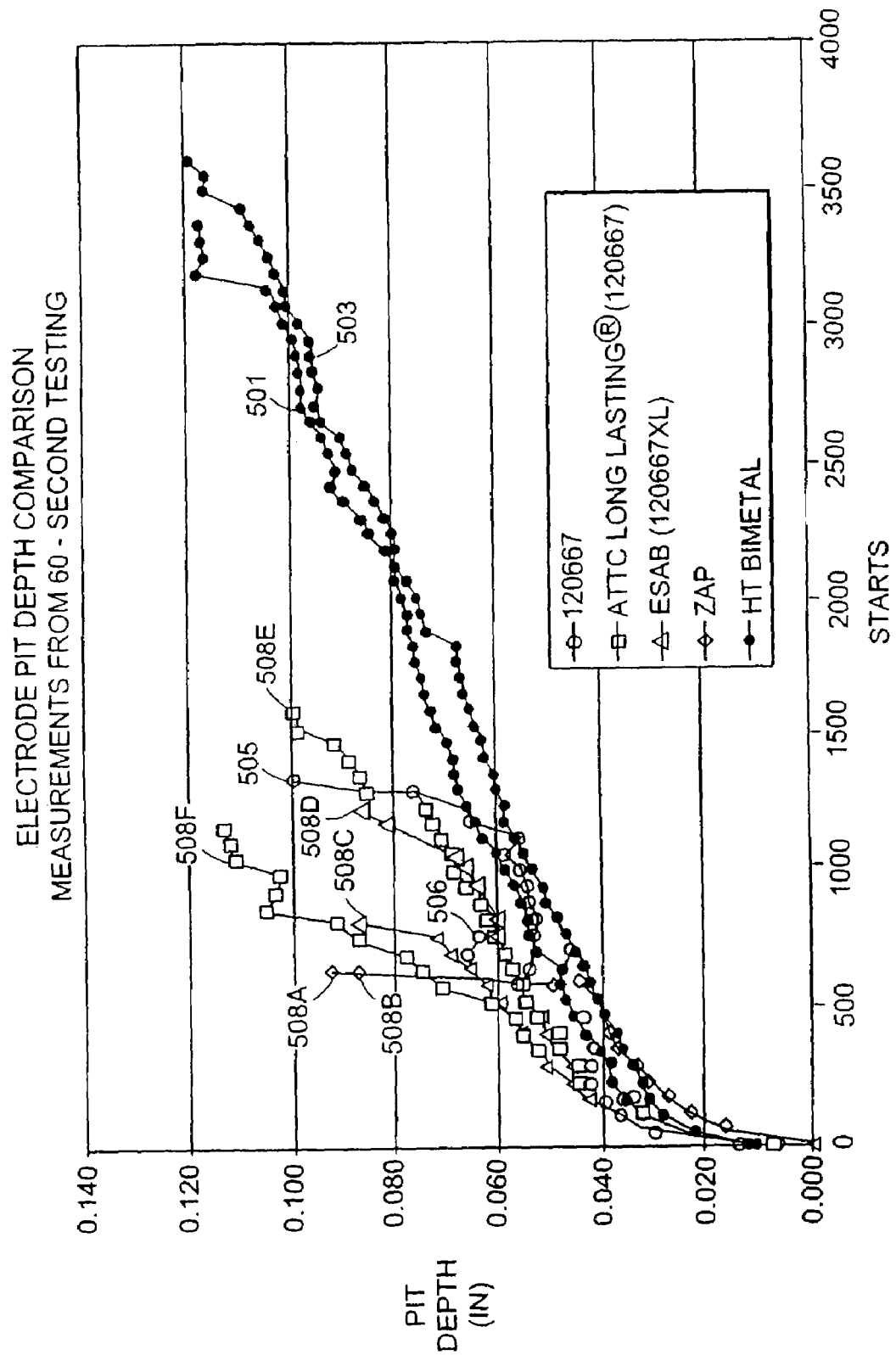
FIG. 5 is a graph comparing the performance of electrodes according to the present invention with other electrodes, using 60 second testing.

FIG. 5 shows a graph of comparable data as FIG. 4, but for 60 second life test measurements (i.e., multiple runs of 60 seconds duration on each of the electrodes). Electrodes according to the invention are labeled on FIG. 5 as 501 and 503. Copper electrode results are labeled as 505 and 506. Results of commercially available copper-silver combination electrodes are labeled as 508A-508F. Again, the results illustrate the superior longevity of the electrodes manufactured according to Applicants' invention.

Figure 6:
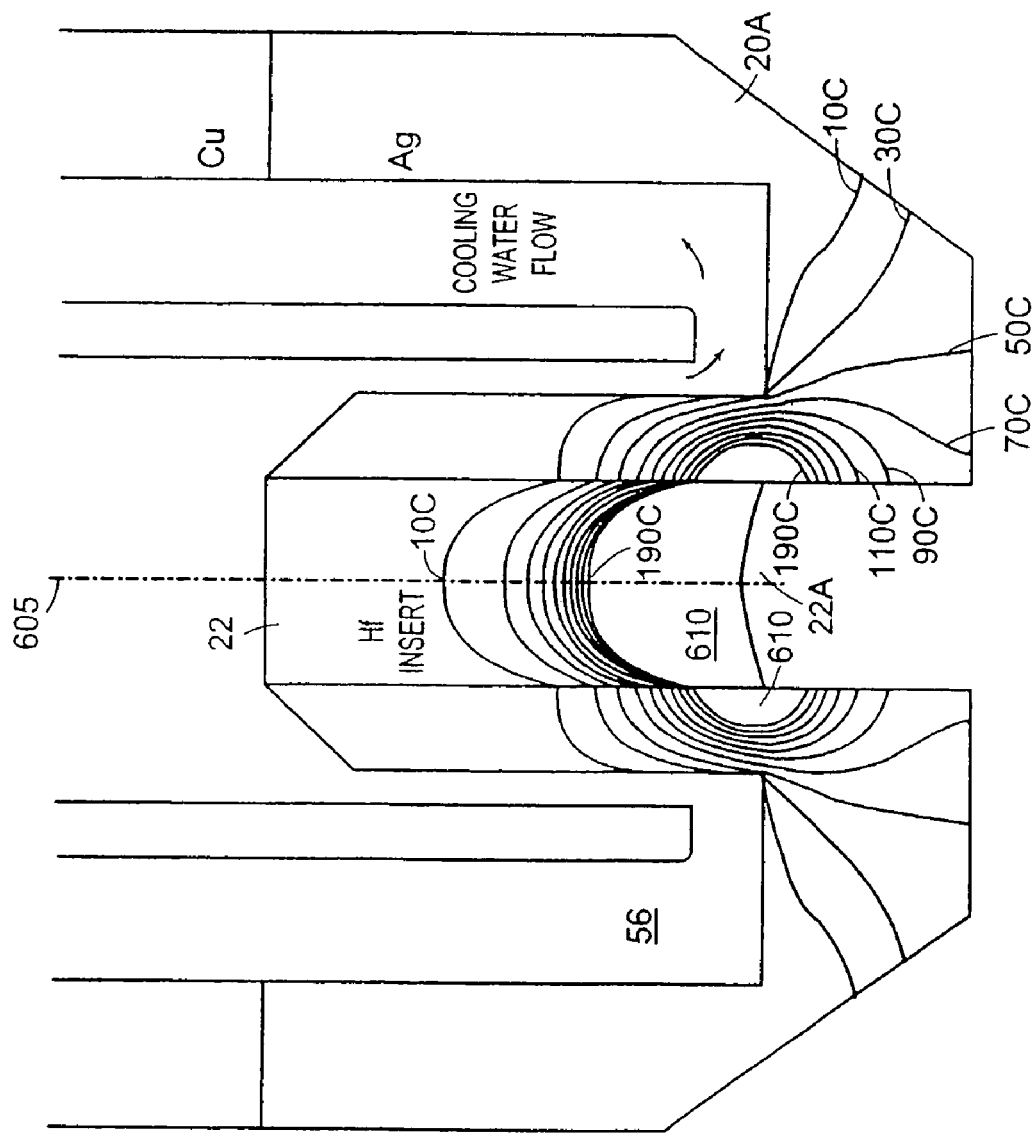
FIG. 6 is a graphical representation showing a temperature contour plot in a model of a silver tip electrode during torch operation, based on a computational fluid dynamics model.

FIG. 6 is a plot showing temperature contours in a silver tip electrode during extended operation based on a computational fluid dynamics model. This plot presents across-sectional view of an operating electrode comprising a hafnium insert 22 within a silver forward portion 20A. The electrode modeled in this figure is symmetrical about a central axis 605.

The electrode is cooled by coolant that is present in the annular recess 56. The temperature at and near the planar emission surface 22A is hotter than the maximum temperature reading displayed by the graph (190 deg-C.), and is displayed as white (area 610). This figure qualitatively demonstrates the degree of radial heat conduction away from the hafnium insert 22 in the electrode, and illustrates the importance of having silver available in the radial direction to enhance conduction.

Figure 7A:
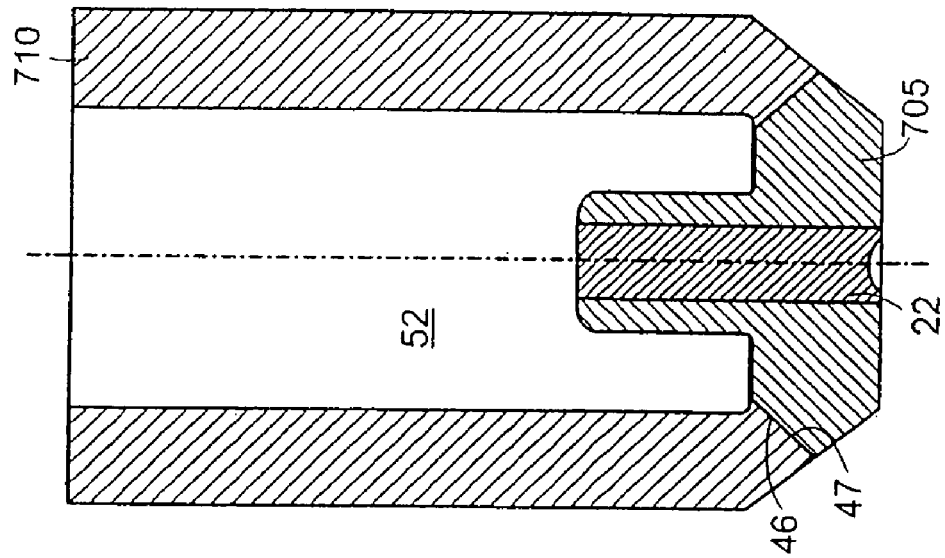
FIGS. 7A-7Q show various embodiments of electrode tip configurations of the invention.
Figure 7B:
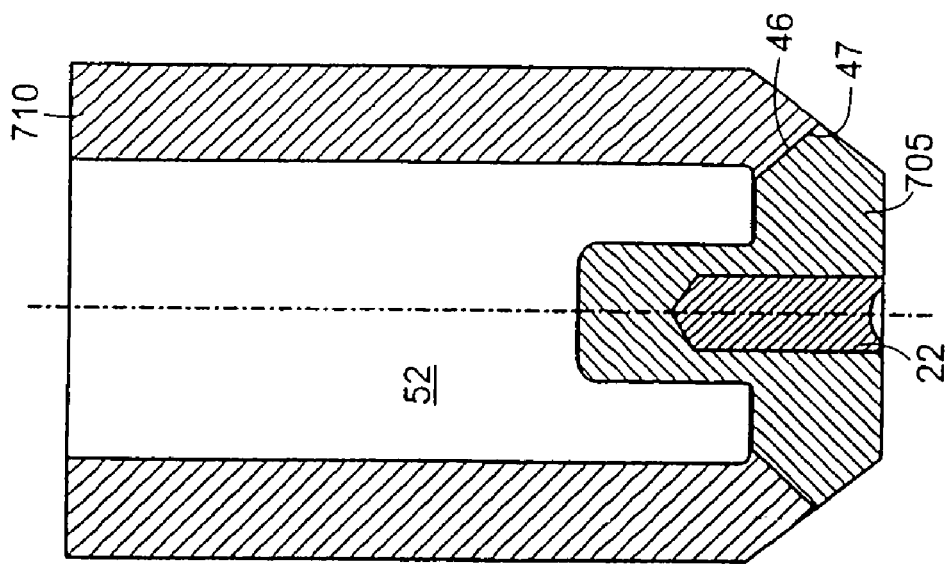
FIG. 7R shows an aft portion of an electrode having a receiving portion.
Figure 7C:
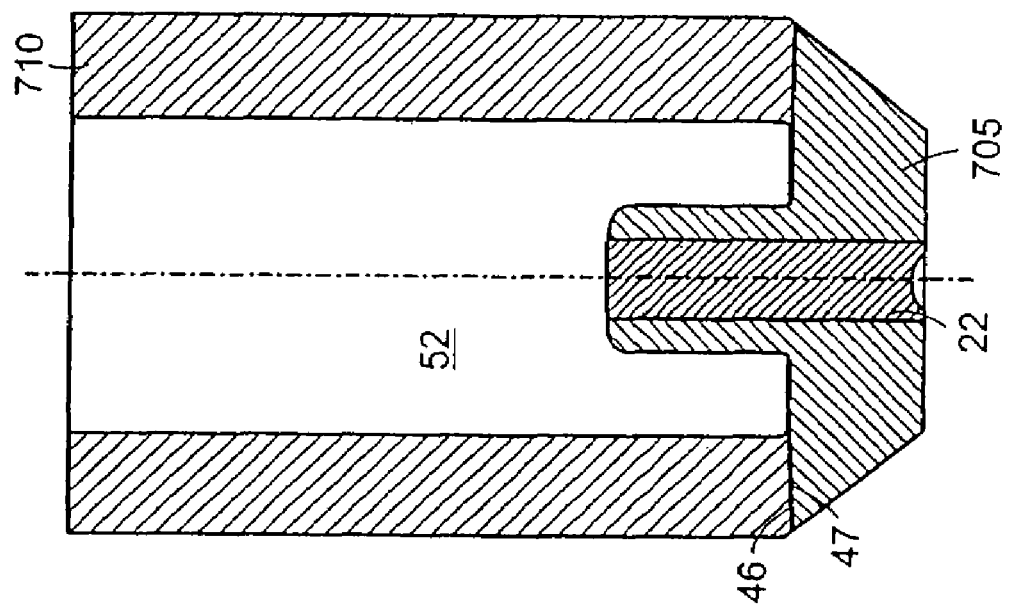
Figure 7D:
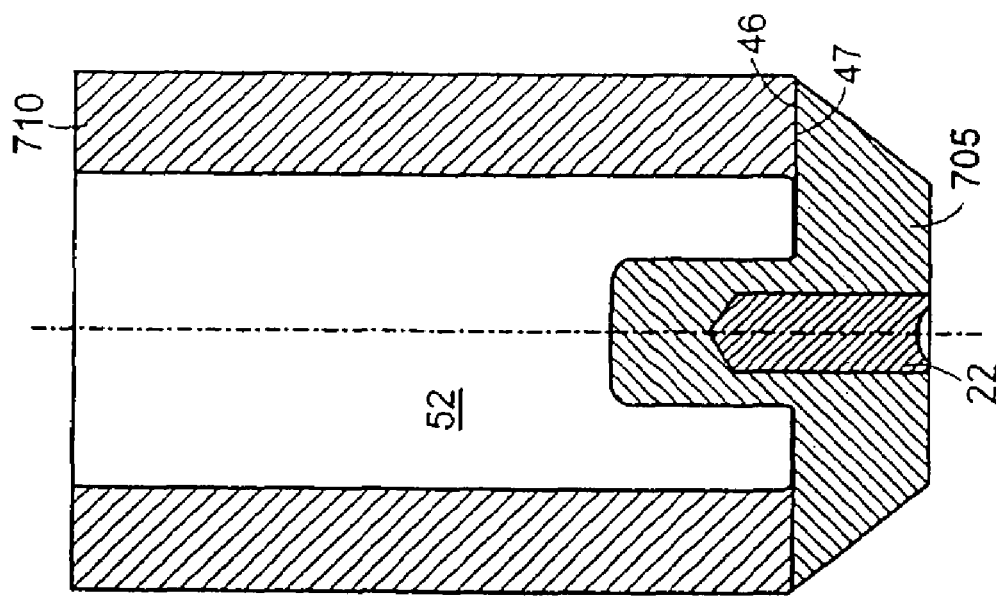
Figure 7H:
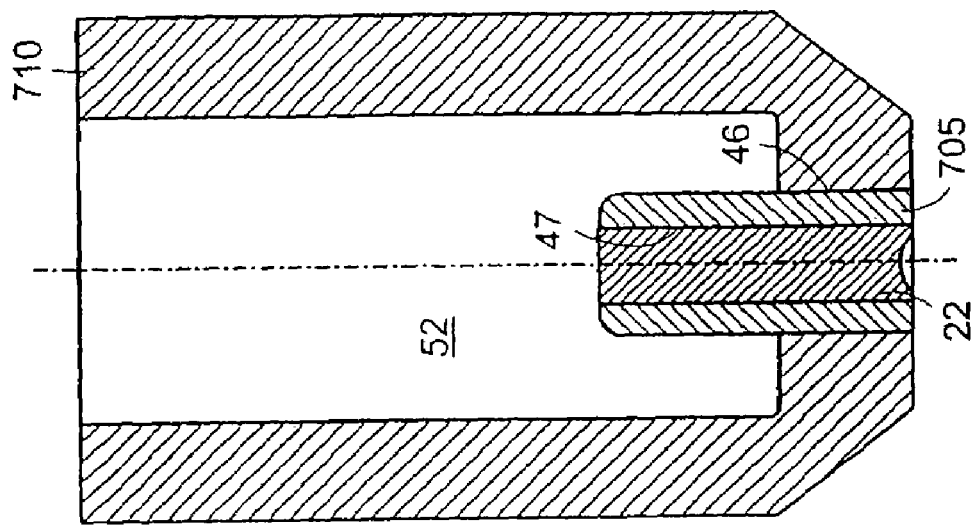
Figure 7G:
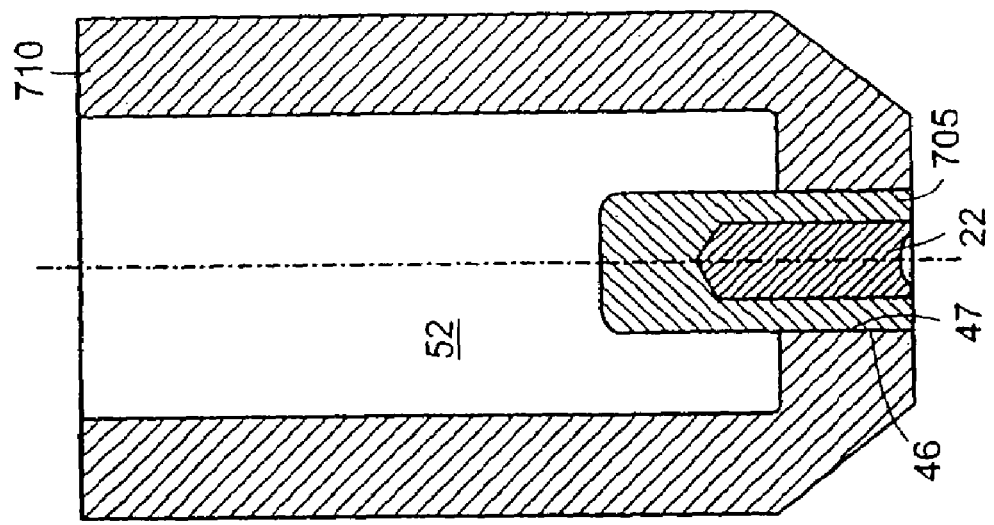
Figure 7J:
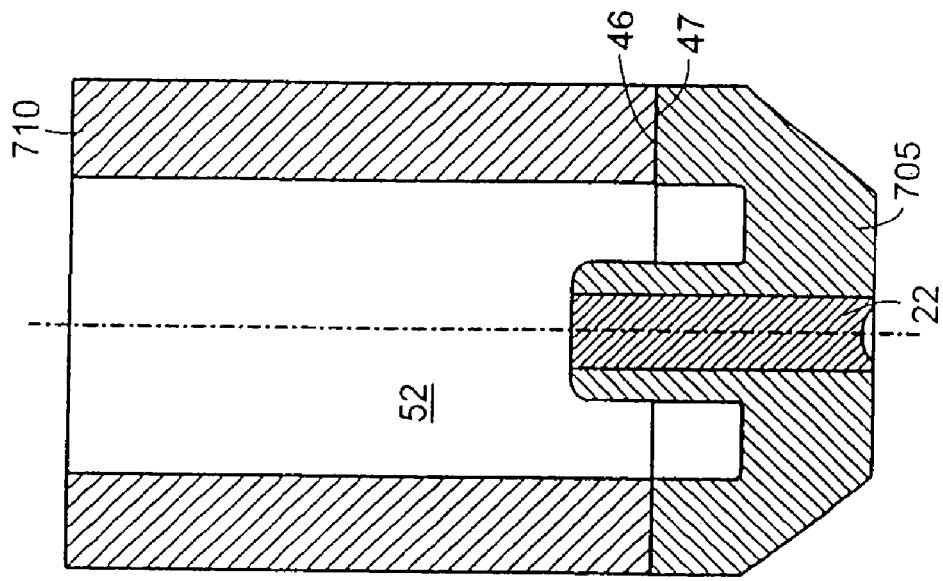
Figure 7I:
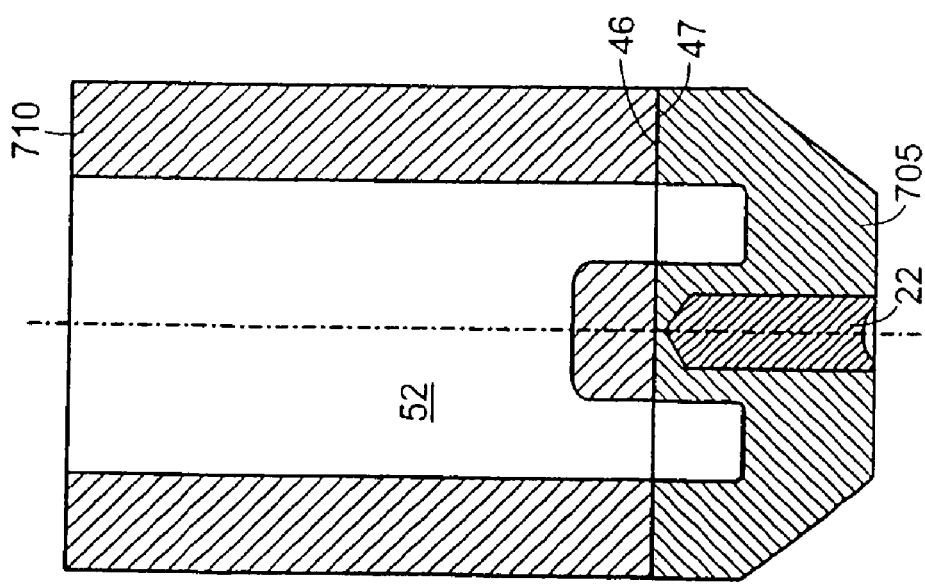
Figure 7K:
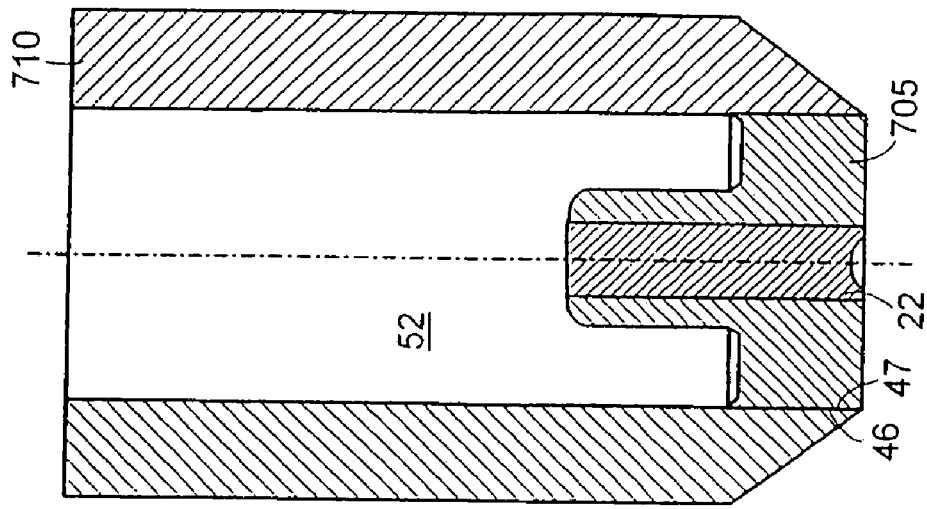
Figure 7L:
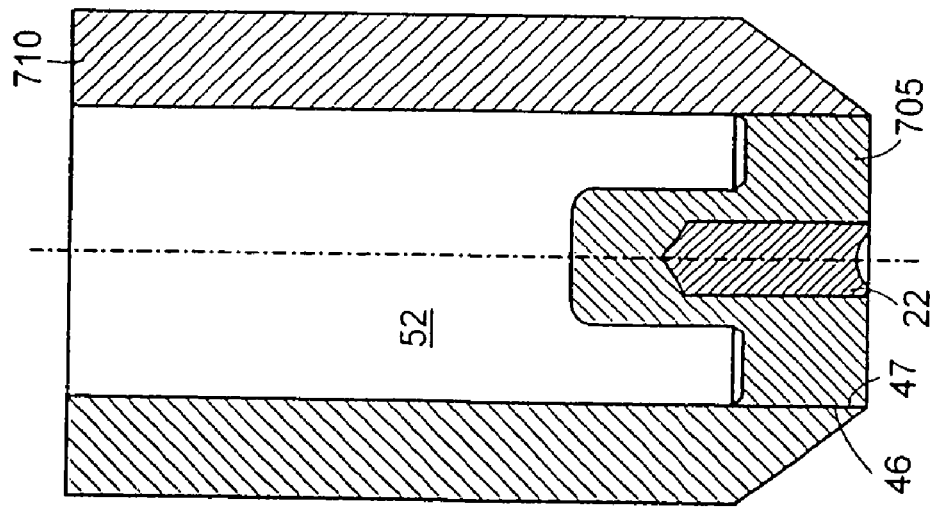
Figure 7M:
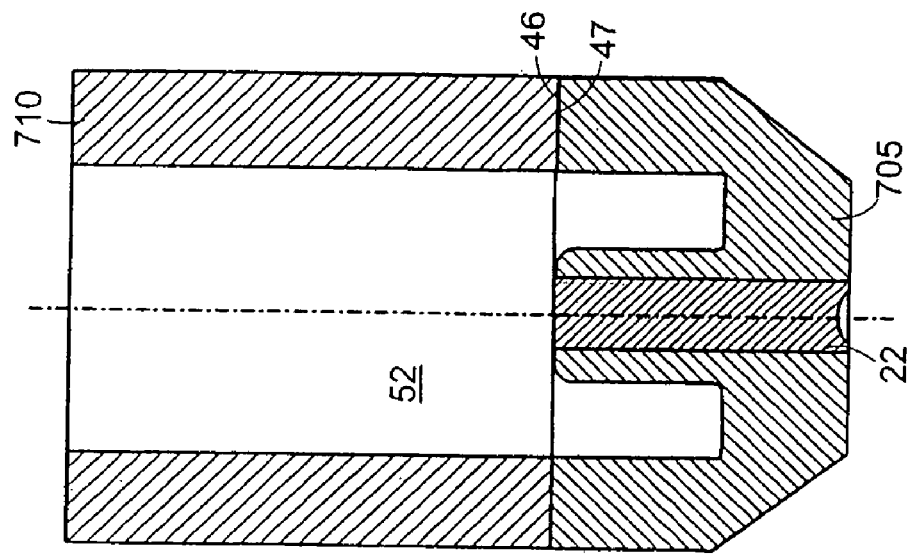
Figure 7N:
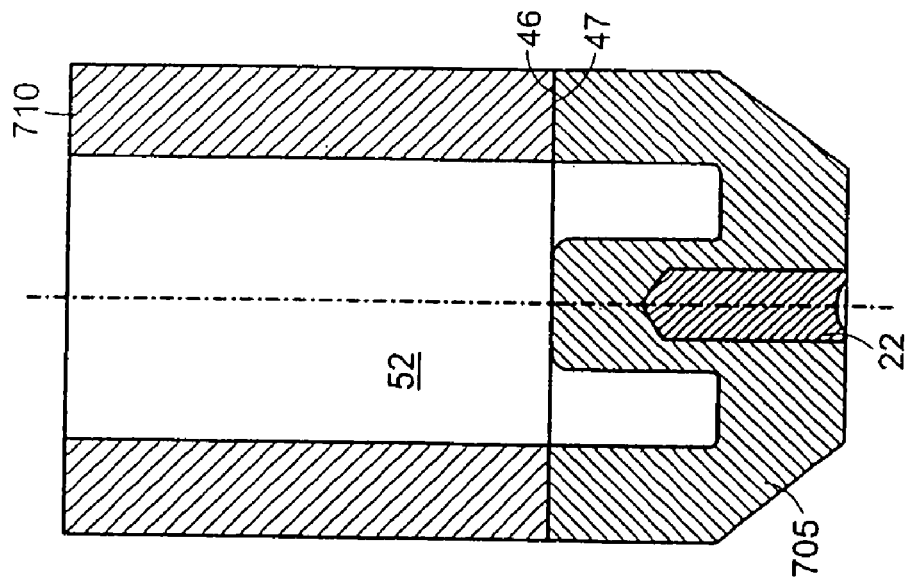
Figure 7P:
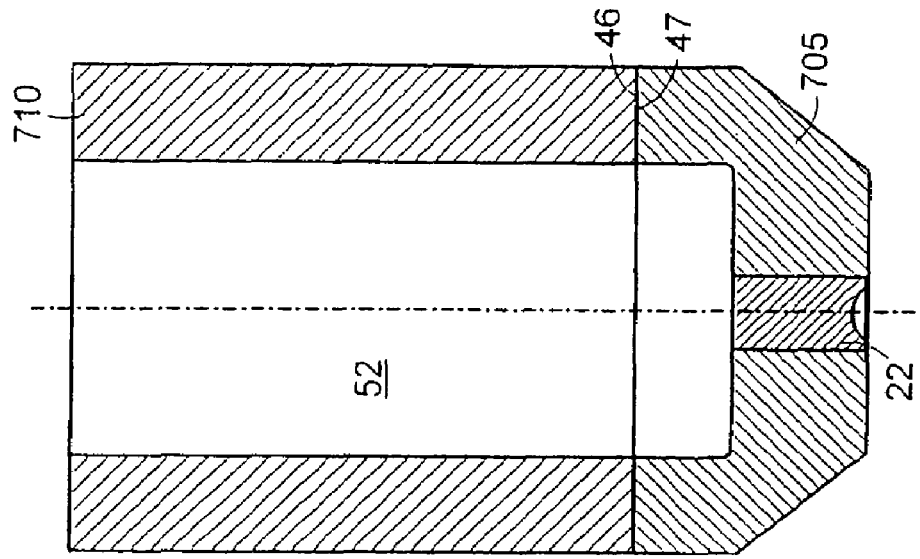
Figure 7O:
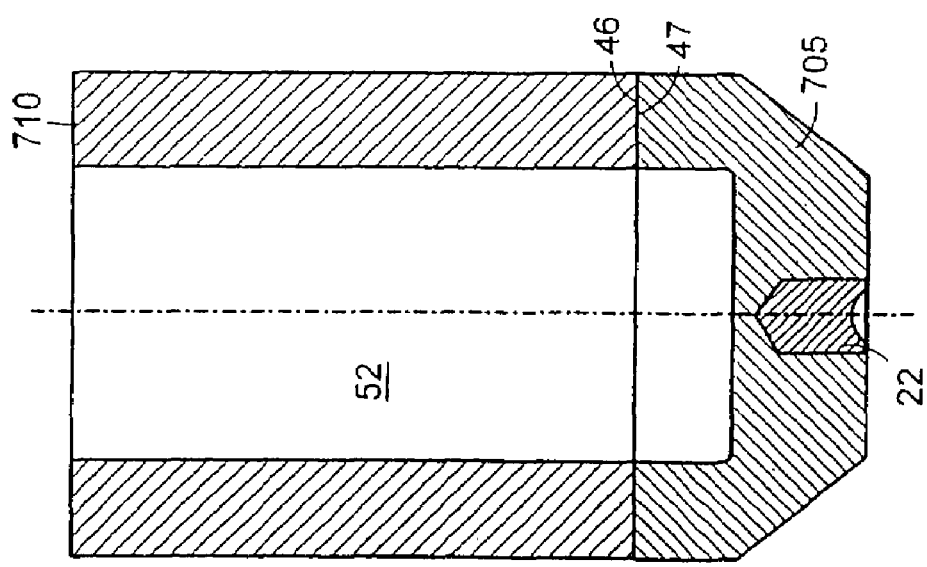

Radial heat conduction away from the hafnium insert 22 is an important feature of the invention. FIGS. 7A-7Q illustrate some different embodiments of different configurations of electrode tips that are within the scope of the invention. The diameter and/or quantity of the silver portion of the electrode tip 705 is sized to achieve the desired amount of radial cooling for a particular application, in combination with the amount and shape of the copper portion of the electrode 710, and the size, shape, and positioning of the hafnium insert 22 or inserts (if multiple inserts are present). In the embodiments of the invention shown in FIGS. 7A-7Q the entire length of the hafnium insert 22 is in contact with the silver portion of the electrode tip 705, to facilitate heat removal.

Figure 7R:
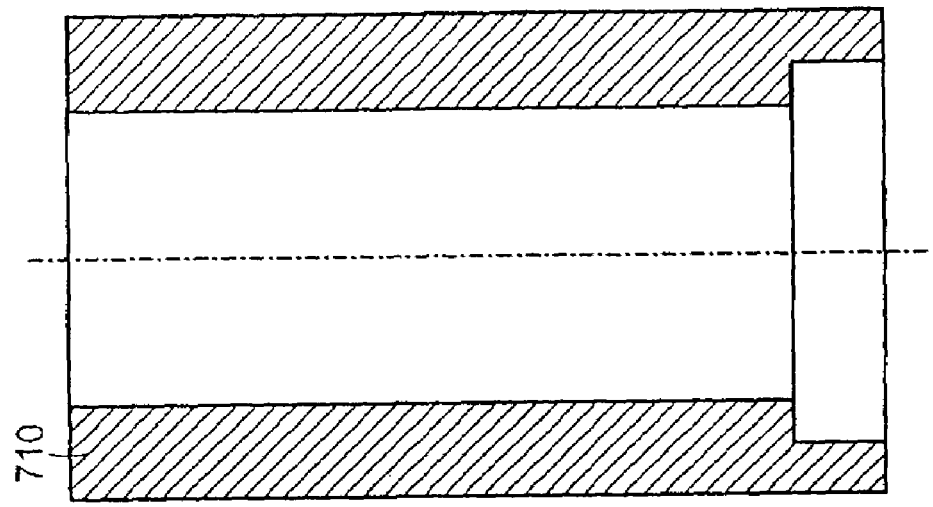
Figure 7Q:
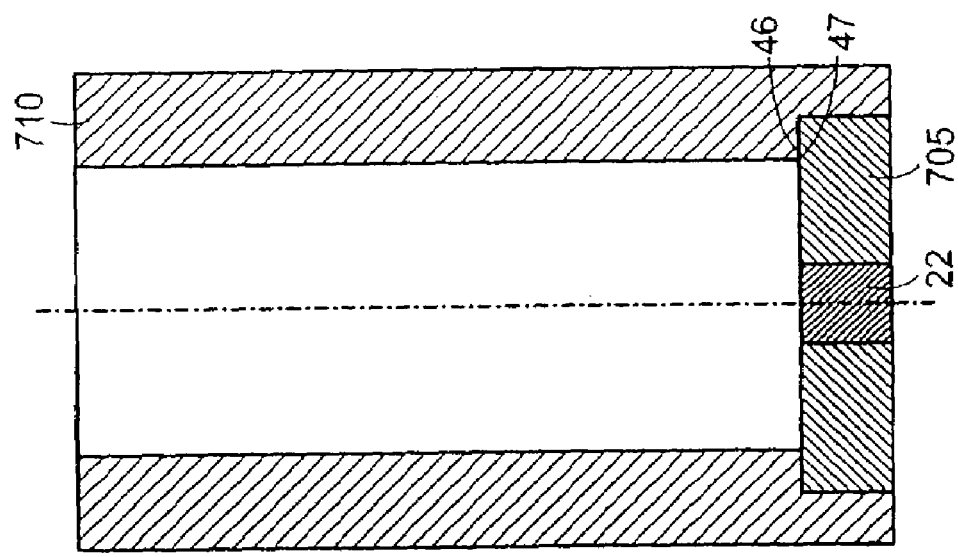

FIG. 7R shows one embodiment where the aft portion of the electrode is adapted to receive the forward portion of the electrode. The size and shape of the aft portion of the electrode 710 can be adjusted to allow the second mating surface 47 to fit within a receiving portion 715 formed by the first mating surface 46. In this embodiment the forward portion of the electrode tip 705 has a smaller diameter than the aft portion of the electrode tip 710, and the forward portion of the electrode tip 705 can be fabricated to fit within the receiving portion 715. The forward portion of the electrode can occupy substantially all of the diameter of the receiving portion 715. After friction welding, this embodiment of the invention can result in an electrode tip such as is depicted in FIG. 7Q.

The described embodiments preferably use coolant 52 to remove heat from the hafnium insert. These geometry of the forward and aft portion of the electrode can be manipulated in combination, to optimize, for example, heat conduction requirements and manufacturing costs. The silver used in the electrode tip is strategically located to optimize utilization of its heat transfer property. Use of direct welding allows less expensive materials (e.g., copper) to be used where the properties of the more expensive materials are not required.

While the invention has been particularly shown and described with reference to specific preferred embodiments, it should be understood by those skilled in the art that various changes in form and detail may be made therein without departing from the spirit and scope of the invention.

We claim:

1. A composite electrode for use in a plasma arc torch comprising:
a body defining a bore and a cooling area which receives a coolant, the body comprising a forward portion, an aft portion, and a forged weld joint;
the forward portion of the body comprising a first material with a heat transfer property, the forward portion including a first mating surface;
the aft portion of the body comprising a second material different from the first material, the heat transfer property of the second material is different than the heat transfer property of the first material, the aft portion including a second mating surface; and
the forged weld joint formed between the forward and aft portions along the first and second mating surfaces without introduction of an additional material to provide direct metallurgical coupling between the first material and the second material along the forged weld joint, the forged weld joint being leak-proof; and
an emissive element disposed within the bore and in thermal contact with the forward portion.

2. The composite electrode of claim 1, wherein the first material has high thermal conductivity.

3. The composite electrode of claim 1, wherein the first material has thermal conductivity greater than about 400 Watts/m/deg-K.

4. The composite electrode of claim 1, wherein the first material has high thermal diffusivity.

5. The composite electrode of claim 1, wherein the first material has thermal diffusivity greater than about 0.1 $m^2$/sec.

6. The composite electrode of claim 1, wherein the first material has thermal diffusivity greater than about 0.17 $m^2$/sec.

7. The composite electrode of claim 1, wherein the first material comprises silver or an alloy thereof.

8. The composite electrode of claim 1, wherein the second material comprises aluminum, brass, copper, or an alloy thereof.

9. The composite electrode of claim 1, wherein the emissive element comprises hafnium, zirconium, tungsten, thorium, lanthanum, strontium, or alloys thereof.

10. A composite electrode for use in a plasma arc torch comprising:
a body defining a bore and a cooling area which receives a coolant, the body comprising a forward port ion, an aft port ion, and a forged weld joint;
the forward port ion of the body comprising a first material with a heat transfer property, the forward portion including a first mating surface;
the aft port ion of the body comprising a second material different from the first material, the heat transfer property of the second material is different than the heat transfer property of the first material, the aft portion including a second mating surface; and
the forged weld joint disposed between the forward and aft portions along the first and second mating surfaces to provide direct metallurgical coupling along the forged weld joint, the forged weld joint having a bend test strength and a tensile test strength equal to that of the first material; and
an emissive element disposed within the bore and in thermal contact with the forward portion.

11. The composite electrode of claim 10, wherein the first material has high thermal conductivity.

12. The composite electrode of claim 10, wherein the first material has thermal conductivity greater than about 400 Watts/m/deg-K.

13. The composite electrode of claim 10, wherein the first material has high thermal diffusivity.

14. The composite electrode of claim 10, wherein the first material has thermal diffusivity greater than about 0.1 $m^2$/sec.

15. The composite electrode of claim 10, wherein the first material has thermal diffusivity greater than about 0.17 $m^2$/sec.

16. The composite electrode of claim 10, wherein the first material comprises silver or an alloy thereof.

17. The composite electrode of claim 10, wherein the second material comprises aluminum, brass, copper, or an alloy thereof.

18. The composite electrode of claim 10, wherein the emissive element comprises hafnium, zirconium, tungsten, thorium, lanthanum, strontium, or alloys thereof.

19. A method of forming an electrode for a plasma arc torch, the method comprising:

utilizing a combination of physical force and acceleration and deceleration of a forward portion comprising a first metallic material with a heat transfer property and an aft portion comprising a second metallic material with the heat transfer property of the second metallic material being different than the heat transfer property of the first metallic material to form an electrode body including a hermetic joint providing direct metallurgical coupling between the forward and aft port ions along the hermetic joint;

forming a bore within the forward port ion to surround at least a port ion of an emissive insert; and inserting the emissive insert into the bore to provide thermal contact between the emissive insert and the forward portion.

20. The method of claim 19, wherein the first material has thermal conductivity greater than about 400 Watts/m/deg-K.

21. The method of claim 19, wherein the first material has high thermal diffusivity.

22. The method of claim 19, wherein the first material has thermal diffusivity greater than about 0.1 m$^2$/sec.

23. The method of claim 19, wherein the first material has thermal diffusivity greater than about 0.17 m$^2$/sec.

24. The method of claim 19, wherein the first material comprises silver or an alloy thereof.

25. The method of claim 19, wherein the second material comprises aluminum, brass, copper, or an alloy thereof.

26. The method of claim 19, wherein the emissive element comprises hafnium, zirconium, tungsten, thorium, lanthanum, strontium, or alloys thereof.

27. The method of claim 19, wherein the physical force is a frictional force or a forge force.

28. The method of claim 19, further comprising the step of applying electricity in combination with the physical force to create a leak-proof joint without the introduction of an additional material.

29. A composite electrode for use in a plasma arc torch, the composite electrode manufactured by a method comprising:

providing an aft portion of an electrode body comprising a first metallic material and having a first mating surface;

providing a forward portion of the electrode body comprising a second metallic material and having a second mating surface configured to join with the first mating surface, wherein the first and second metallic materials have a heat transfer property, the value of the heat transfer property for the second metallic material being greater than that of the first metallic material; and directly welding the first and the second mating surfaces to form a joint, wherein directly welding is a process selected from the group consisting of friction welding, inertia friction welding, direct drive friction welding, CD percussive welding, percussive welding, ultrasonic welding and explosion welding.

30. The method of claim 29, wherein the joint between the first and second mating surfaces forms a hermetic seal.

* * * * *

UNITED STATES PATENT AND TRADEMARK OFFICE
CERTIFICATE OF CORRECTION

| | | |
|---|---|---|
| PATENT NO. | : 7,659,488 B2 | Page 1 of 1 |
| APPLICATION NO. | : 11/495945 | |
| DATED | : February 9, 2010 | |
| INVENTOR(S) | : David J. Cook et al. | |

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 257 days.

should read (*) Notice: Subject to any disclaimer, the term of this patent is extended or adjusted under 35 U.S.C. 154(b) by 453 days.

In claim 10, at column 10, line 28, delete "port ion" and replace it with --portion--.

In claim 10, at column 10, line 29, delete "port ion" and replace it with --portion--.

In claim 10, at column 10, line 30, delete "port ion" and replace it with --portion--.

In claim 10, at column 10, line 33, delete "port ion" and replace it with --portion--.

In claim 19, at column 11, line 9, delete "port ion" and replace it with --portion--.

In claim 19, at column 11, line 12, delete "port ion" and replace it with --portion--.

In claim 19, at column 11, line 13, delete "port ion" and replace it with --portion--.

Signed and Sealed this

Eighteenth Day of May, 2010

David J. Kappos
*Director of the United States Patent and Trademark Office*